United States Patent
Djelouah

(10) Patent No.: US 6,712,958 B2
(45) Date of Patent: Mar. 30, 2004

(54) METHOD AND APPARATUS FOR RECOVERY OF A SLICK FLOATING ON THE SURFACE OF A LIQUID

(75) Inventor: Salah Djelouah, Saint Denis de l'Hotel (FR)

(73) Assignee: Sorelec, Saint Jean de Braye (FR)

( * ) Notice: Subject to any disclaimer, the term of this patent is extended or adjusted under 35 U.S.C. 154(b) by 0 days.

(21) Appl. No.: 10/035,893

(22) Filed: Nov. 9, 2001

(65) Prior Publication Data

US 2002/0104797 A1 Aug. 8, 2002

(30) Foreign Application Priority Data

Nov. 9, 2000 (FR) .............................. 00 14385

(51) Int. Cl.7 .............................................. E02B 15/04
(52) U.S. Cl. ...................... 210/122; 210/242.3; 210/923
(58) Field of Search .............................. 210/122, 242.1, 210/242.3, 776, 923, 540

(56) References Cited

U.S. PATENT DOCUMENTS

| | | | |
|---|---|---|---|
| 1,450,545 A | * 4/1923 | Hans ........................... | 210/122 |
| 3,534,859 A | * 10/1970 | Amero et al. ............ | 210/242.3 |
| 3,635,342 A | 1/1972 | Mourlon et al. | |
| 3,693,800 A | * 9/1972 | Stanfield et al. ......... | 210/242.3 |
| 3,722,689 A | * 3/1973 | Markel et al. ........... | 210/242.3 |
| 3,753,496 A | 8/1973 | Boyd | |
| 3,810,546 A | * 5/1974 | Oxenham ................ | 210/242.3 |
| 3,853,768 A | * 12/1974 | Bagnulo ...................... | 210/923 |
| 4,024,063 A | * 5/1977 | Mori ........................ | 210/242.3 |
| 4,038,182 A | * 7/1977 | Jenkins ........................ | 210/923 |
| 4,111,809 A | * 9/1978 | Pichon .................... | 210/242.3 |
| 4,142,972 A | * 3/1979 | Nebeker et al. ......... | 210/242.3 |
| 5,118,412 A | * 6/1992 | Schmidt .................... | 210/122 |
| 5,200,066 A | * 4/1993 | Jorgensen ................ | 210/242.3 |

FOREIGN PATENT DOCUMENTS

FR 2 219 672 A 9/1974
WO WO 97/32087 9/1997

* cited by examiner

Primary Examiner—Christopher Upton
(74) Attorney, Agent, or Firm—Baker & Daniels

(57) ABSTRACT

Method and apparatus for recovery of the product forming a slick floating on the surface of the water such as an oil slick. The apparatus comprises a recovery head formed by an enclosure having in the upper part an inlet for the product to be recovered and in the lower part an outlet for the recovered product, as well as a vortex generator which creates in the enclosure a dynamic vortex which descends in the enclosure as far s its outlet; a flotation means which supports the enclosure so as to keep its inlet at the level of the slick to be recovered; and a pipe connecting the outlet of the enclosure to a tank.

6 Claims, 2 Drawing Sheets

METHOD AND APPARATUS FOR RECOVERY OF A SLICK FLOATING ON THE SURFACE OF A LIQUID

BACKGROUND OF THE INVENTION

The present invention relates to a method and to apparatus for recovery of a slick floating on the surface of the water such as an oil slick.

Different methods and apparatus are known for recovering the product from a slick floating on the surface of the water and, in particular, an oil slick floating at sea.

The known methods and apparatus are very varied, ranging from floating booms to floating storage or recovery devices. The recovery devices are classified into two types, the mechanical recovery devices making use of the fluid flow properties and the density of the liquid to be recovered and the oleophilic recovery devices being intended more particularly for the recovery of oil and using the properties of adhesion of the oil on surfaces which are brought into contact with the water and the pollutant.

This classification is published in a study by CEDRE (Centre de documentation de recherche et expérimentations sur les pollutions accidentelles des eaux) entitled "La récupération du pétrole en mer" (extract from the INFOPOL course organized by CEDRE in 1999).

The mechanical recovery devices use either direct suction or suction with a spillway or even a simple conveyor belt or a conveyor belt working by submersion.

The oleophilic recovery devices consist in general of an assembly of discs, drums or equipment having belts or ropes, which penetrate into the slick and take advantage of the adhesion of the oil on the structure of the discs, the belts or the ropes in order to catch the product there, to transport it and to discharge it. It is generally removed by scraping or squeezing.

Among the mechanical recovery devices there is one known as a vortex recovery device formed by a pumping head or strainer which comes over the slick to be pumped, at the level of the slick. Below the pumping head, an agitator creates a depression by forming a static vortex in such a way as to accumulate the product which is less dense than the water in order to concentrate it below the strainer.

In fact, this apparatus uses an agitator in order to create a pocket in which the liquid to be pumped accumulates below the suction head.

According to the analysis made in this document and summarizing the tests, this apparatus is very delicate to use and is only suitable for fluid products in calm waters. This method and this apparatus do now allow partially solid products to be pumped because the pumping is done from above in the opposite direction to the direction in which the static vortex creates the depression forming the pocket.

In other words, the static vortex and the suction effect of pumping act in opposite directions.

This method cannot be used when the surface of the water is agitated because then the penetration of air into the pumping head risks stopping the pump.

SUMMARY OF THE INVENTION

The object of the present invention is to remedy the drawbacks of the known solutions and the invention proposes the development of a method and an apparatus permitting pumping in an extremely efficient manner of slicks of product floating on the surface of the water, regardless of the physical nature of the products (fluid, semi-fluid or even partially solidified state), and regardless of the characteristics of the location of the floating slick, whether this location is subject to the swell, the wind, to surface currents, or indeed the location where the slick is situated.

To this end the invention relates to a method characterized in that:
a dynamic vortex is created below the surface of the floating slick,
this vortex is supplied with the slick while practically retaining the liquid on which the product is floating,
the product is discharged via the base of the dynamic vortex.

The vortex according to the invention causes the flow of product taken from the slick to circulate in order to discharge it, this flow possibly being taken up by a pump connected to the outlet of the vortex.

This suction will then be added to the surge communicated to the fluid in the region of the vortex.

The recovery of the product may be carried out in a manner very largely independent of the physical nature of the recovered product, regardless of whether the product is liquid, more or less pasty or even contains solid particles or parts.

The method permits recovery even of solid particles floating on the surface of the slick, since these particles will be entrained in the vortex and discharged from there.

The invention also relates to a recovery apparatus of the type defined above, characterized in that it comprises:
a recovery head formed by an enclosure having in the upper part an inlet for the product to be recovered and in the lower part an outlet for the recovered product, as well as a vortex generator which creates in the enclosure a dynamic vortex which descends in the enclosure as far as its outlet,
a flotation means which supports the enclosure so as to keep its inlet at the level of the slick to be recovered,
a pipe connecting the outlet of the enclosure to a tank.

The dynamic vortex generator is advantageously an agitator immersed in the enclosure and borne by the shaft of a motor.

Regardless of whether it is a question of the method or of the apparatus, in both cases there is a dynamic vortex, that is to say a vortex which produces a fluid circulation from top to bottom, from the inlet of the recovery device to its outlet, and not a simple static depression creating a pocket filled with product of lesser density than that of the liquid in which the slick of product normally floats, that is to say fresh water or sea water.

The agitator which creates the vortex is advantageously immersed at an adjustable height in the enclosure of the floating slick, which enables the vortex effect to be adapted to the nature of the products to be recovered.

The enclosure is advantageously in the shape of a funnel following the flow lines of the vortex, the flared portion of the enclosure constituting the product inlet, while the tip of the cone constitutes the outlet connected to the discharge pipe.

This shape of the enclosure like a funnel favors the flow of the product slick in the vortex without creating dead zones which would be occupied by the product or by water.

The outlet of the enclosure is advantageously connected to a discharge pipe equipped with a suction means. This discharge pipe may have a certain length as a function of the arrangement of the different means of the apparatus and notably of the recovery head and the tanks for collecting the product.

In the case of a discharge pipe connected to a suction means such as a pump, it is advantageous for a control unit to be connected to the motor of the vortex generator and to the suction means in order to co-ordinate the operation of these two means and to permit optimum output.

The flotation means is advantageously formed by floats supporting the enclosure and the vortex generator. This flotation means does not constitute a closed barrier placed above the enclosure or surrounding the latter. On the contrary, it is solely a matter of separate points of support leaving passages between them to enable not only the slick but also the surface of the slick to penetrate into the enclosure in order to be taken up by the vortex.

In these circumstances it is particularly advantageous for the connection between the floats and the enclosure to be adjustable, which allows the depth of immersion of the inlet of the enclosure to be adjusted as a function of the thickness of the slick of product to be recovered.

This floating placement of the apparatus makes it possible to follow the variations of height of the slick, particularly as a function of the swell.

Generally speaking, the method and the apparatus according to the invention constitute means which are extremely simple to implement, capable of operating in extreme conditions both as regards the situation of the slick to be recovered and the nature of the products.

Finally, the apparatus is particularly simple to maintain and to put into operation and it is not very cumbersome.

BRIEF DESCRIPTION OF THE DRAWINGS

The present invention will be described below in greater detail with the aid of the accompanying drawings, in which.

DESCRIPTION OF THE PREFERRED EMBODIMENT

Figure 1:
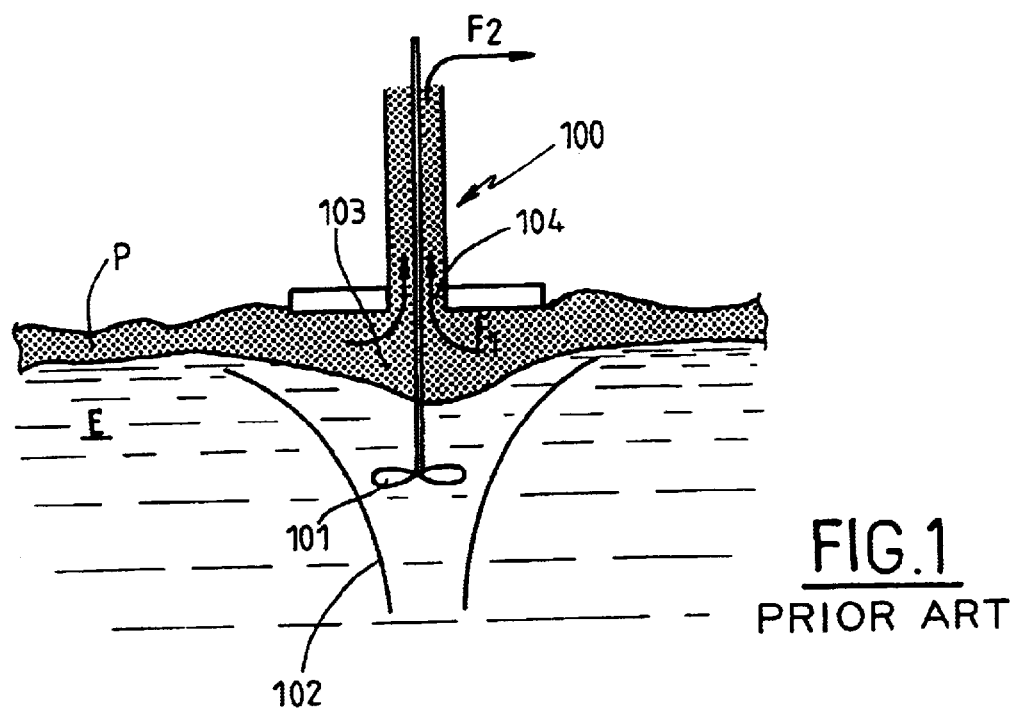
FIG. 1 shows a diagram of a known prior art apparatus

According to FIG. 1 a known apparatus of the vortex type for mechanical recovery of the product P floating in the form of a slick on the surface of the water E is composed of a suction head 100 placed on the surface of the slick P. This suction head 100 has an agitator 101 driven by a motor (not shown) and is accommodated in a trumpet-shaped caisson 102 surrounding the agitator 101. The agitator 101 creates a depression in the interior of the caisson 102 in order to form a pocket 103 below the inlet 104 of the suction head 100 so that a layer of product P accumulates there, permitting pumping. The product P is pumped as indicated by the arrows F1, F2.

In this known apparatus the agitator 101 creates a sort of static vortex forming the pocket in which the product P accumulates; this latter can then be sucked up. However, as already indicated, this suction is opposed to the suction created by the static vortex.

Figure 2:
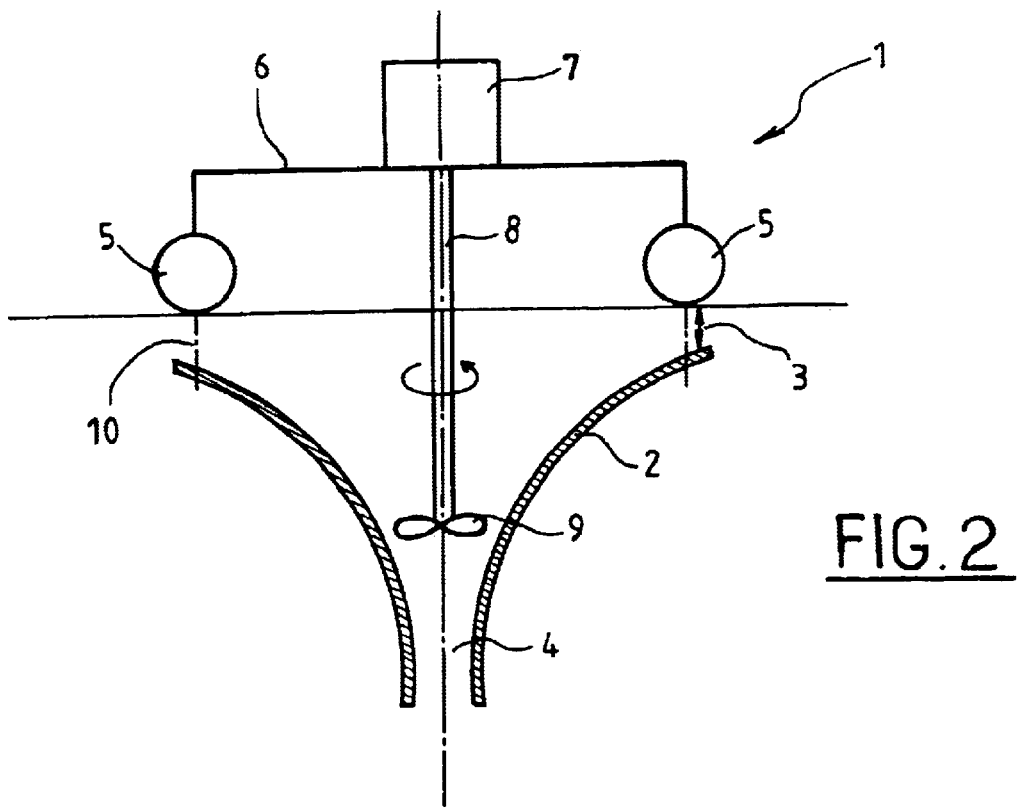
FIG. 2 shows a diagram of the apparatus according to the invention.
Figure 3:
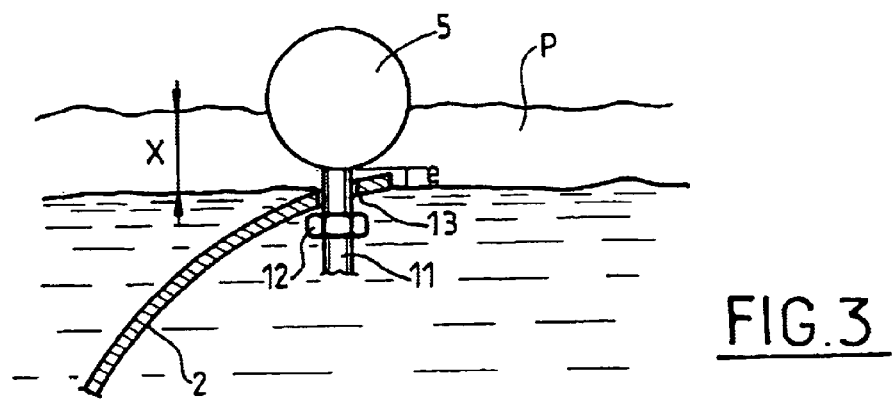
FIG. 3 shows a detail of the apparatus according to FIG. 2.
Figure 4:
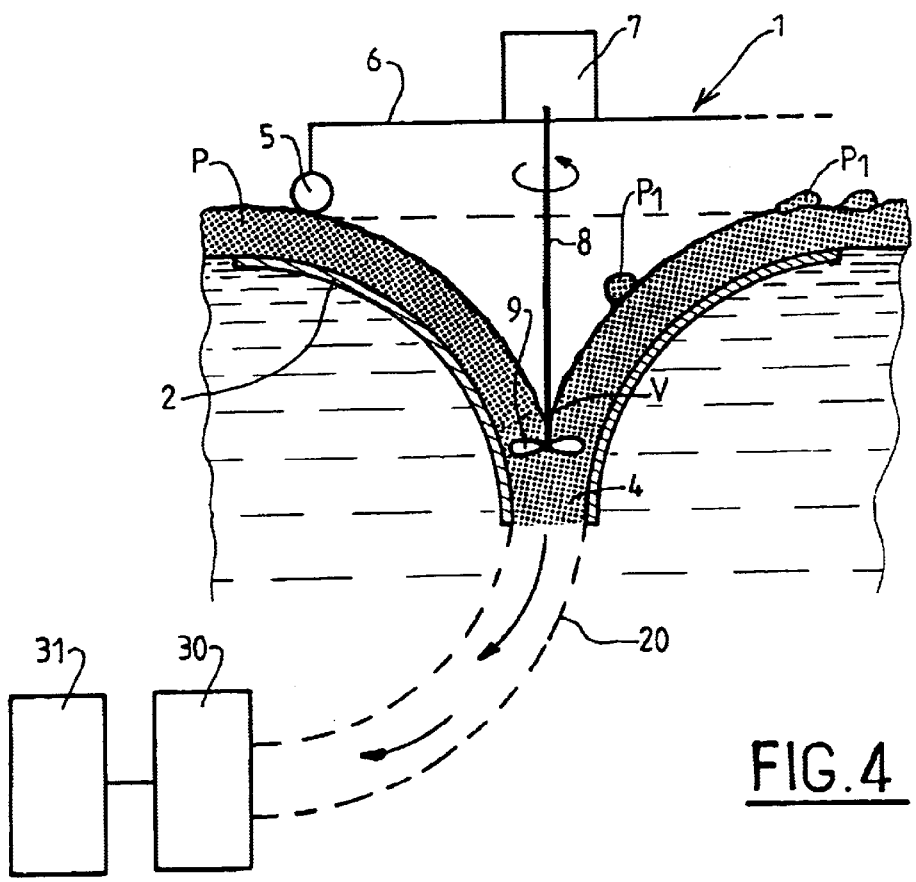
FIG. 4 shows the apparatus according to the invention of FIG. 2 in the operating position.

The present invention relates to an apparatus such as that shown in FIGS. 2 and 3 and in the operating position in FIG. 4.

According to FIG. 2, the apparatus is composed of a recovery head 1 formed by an enclosure 2 having an inlet or opening 3 in the upper part and an outlet 4 in the lower part.

This head 1 is borne by a flotation means consisting of floats 5 which are integral with a chassis or frame 6. The chassis 6 also bears a motor 7, the shaft 8 of which is equipped with an agitator 9 which constitutes a vortex generator. This agitator 9 creates a dynamic vortex in the enclosure 2 which is preferably in the shape of a trumpet according to the flow lines of a vortex.

The enclosure 2 is connected to the frame 6 by means of connecting devices 10 of adjustable length. These connecting devices are shown connected to the floats 5. They could equally be connected directly to the frame 6. These connecting devices 10 of adjustable length permit modification of the depth (e) of immersion of the edge of the enclosure 2 which constitutes the inlet 3. This adjustment is made as a function of the thickness X of the slick of product P to be recovered (see FIG. 3).

As adjustment means there is provided, in this particular example, a threaded rod 11 connected to the float 5 and equipped with a nut 12 in order to hold the edge 13 of the enclosure 2. Thus the height (e) of the opening 3 is defined.

FIG. 4 shows the apparatus according to the invention in the position of use.

The recovery head is placed in a slick of product P and is supported on the slick, and more generally on the surface of the liquid, by means of its floats 5. These floats 5 do not constitute a ring surrounding the top of the disclosure 2 but rather they form supports distributed over the surface of the slick or of the liquid as is indicated in FIG. 4 in which, by contrast with FIG. 2, the left-hand float 5 has not been shown.

It is extremely important that the float or floats 5 do not constitute a closed barrier extending over the top of the inlet of the enclosure 2 so as not to force the slick of product P to pass necessarily under all of the floats 5.

On the contrary, and as shown in the right-hand part of FIG. 4, more or less solid products P1 can themselves float on the surface of the slick P. These may be particles P1 of more or less solidified products. All these particles, even floating on the surface, can penetrate into the enclosure 2, sucked up by the dynamic vortex created by the agitator 9.

This means that the agitator 9 creates not only a depression in the enclosure 2 but a vortex V, shown schematically in FIG. 4, which goes at least as far as the outlet 4 of the enclosure 2.

This dynamic vortex sucks the upper layer of the liquid in which the recovery head 1 is floating and which is principally constituted by the slick of product P.

The outlet 4 of the enclosure 2 is connected to a pipe 20 for the discharge of the product. This pipe 20 is preferably connected to a pump 30 which discharges the liquid to a tank 31.

Thus according to the method according to the invention for recovery of the product forming a slick on the surface of the water, such as an oil slick, a dynamic vortex is created below the surface of the floating slick; this vortex is supplied with the slick, principally retaining the liquid on which the product to be recovered is floating and the product is discharged, possibly with liquid, via the base of the vortex.

This discharge is carried out in the same direction of action as that of the vortex.

In particular, the product is sucked, possibly with liquid, at the base of the vortex. This suction is added to the effect of suction or of pressure of the vortex. This method permits recovery of the product P floating on the surface of the liquid E, practically regardless of the state of the product P, liquid, more or less viscous and even containing solid particles. Even if the surface of the slick of product P is more or less agitated, this slick can be recovered efficiently by the active vortex.

What is claimed is:

1. Apparatus for recovery of a product forming a slick floating on the surface of water, said apparatus comprising:

an enclosure adapted for vertical positioning, said enclosure having an inlet in the upper portion of said enclosure for permitting ingress of a product to be recovered, and an outlet located in the lowermost portion of said enclosure for outflow of recovered product from said enclosure;

an agitator disposed in said enclosure between said inlet and said outlet, said agitator adapted to generate a dynamic vortex which descends downwardly in said enclosure into said outlet;

a motor, said motor including a shaft, said shaft drivingly secured to said agitator;

a float operatively secured to said enclosure for floatingly supporting said enclosure on water to thereby keep said inlet at the level of a slick to be recovered; and a conduit connected to said outlet for conducting recovered product from said outlet.

2. Apparatus of claim 1 wherein said float is adjustable in height relative to said enclosure.

3. Apparatus of claim 1 wherein said enclosure has a funnel shape which generally follows the contours of a vortex, said funnel shape including an outwardly flared portion, said outwardly flared portion comprising said inlet, said funnel shape including a narrowed tip, said narrowed tip comprising said outlet.

4. Apparatus of claim 1 including a suction pump, said suction pump connected to said outlet.

5. Apparatus of claim 4 including a control, said control connected to said motor and to said pump for controlling the operation of at least one of said pump and said motor as a function of the other.

6. Apparatus of claim 1 wherein said float is spaced a vertical distance from said enclosure, said distance being adjustable, whereby the depth of immersion of said inlet into a slick is adjustable as a function of the thickness of a said slick of product to be recovered.

* * * * *